United States Patent
Harris

(10) Patent No.: US 12,173,814 B2
(45) Date of Patent: Dec. 24, 2024

(54) FEMALE ISO FLARE UNION WITH INTEGRATED MATING BRAKE ISO F FLARE PORT

(71) Applicant: Martinrea International US Inc., Auburn Hills, MI (US)

(72) Inventor: Larry Harris, Otisville, MI (US)

(73) Assignee: Martinrea International US Inc., Auburn Hills, MI (US)

( * ) Notice: Subject to any disclaimer, the term of this patent is extended or adjusted under 35 U.S.C. 154(b) by 27 days.

(21) Appl. No.: 18/122,408

(22) Filed: Mar. 16, 2023

(65) Prior Publication Data

US 2023/0296195 A1 Sep. 21, 2023

Related U.S. Application Data

(60) Provisional application No. 63/321,144, filed on Mar. 18, 2022.

(51) Int. Cl.
  *F16L 13/14* (2006.01)
  *F16L 19/025* (2006.01)

(52) U.S. Cl.
  CPC .......... *F16L 13/142* (2013.01); *F16L 19/025* (2013.01)

(58) Field of Classification Search
  CPC ... F16L 19/025; F16L 19/028; F16L 19/0283; F16L 19/0286; F16L 13/141; F16L 13/161
  See application file for complete search history.

(56) References Cited

U.S. PATENT DOCUMENTS

| | | | |
|---|---|---|---|
| 4,842,310 | A | 6/1989 | Müffke et al. |
| 5,310,029 | A | 5/1994 | Kujawski |
| 5,346,262 | A | 9/1994 | Liebig |
| 5,997,050 | A | 12/1999 | Fleckenstein et al. |
| 6,527,304 | B1 | 3/2003 | Pliassounov |
| 6,663,146 | B1 | 12/2003 | Sakai et al. |
| 6,729,659 | B2 | 5/2004 | Schroeder et al. |
| 7,600,792 | B2 | 10/2009 | Wada |
| 8,113,548 | B2 | 2/2012 | Gunderson |
| 8,152,204 | B2 | 4/2012 | Pliassounov |
| 8,172,278 | B2 | 5/2012 | Abbott et al. |
| 9,291,291 | B2 | 3/2016 | Deane et al. |
| 10,107,429 | B2 | 10/2018 | Jensen |

(Continued)

FOREIGN PATENT DOCUMENTS

| | | |
|---|---|---|
| CN | 208793842 U | 4/2019 |
| WO | 2015056060 A1 | 4/2015 |

OTHER PUBLICATIONS

Master Power Brakes, Master Power Brakes 25' Cunifer Brake Line Tubing, May 8, 2013, pp. 1-2 (Year: 2013).*

*Primary Examiner* — William S. Choi
(74) *Attorney, Agent, or Firm* — Dinsmore & Shohl LLP

(57) ABSTRACT

A brake union for providing a secure and leak free connection between first and second fluid carrying lines inserted into a female union body having a first and second open ends. Each of the fluid carrying lines exhibits an expanded, typically flared, end form which, upon inserting through the female body, seat against one another. A mating flare nut coaxially surrounds one of the fluid carrying lines and includes exterior threads which inter-engage interior threads of the female body, with tightening to establish a fluid-tight connection between the opposing end forms.

5 Claims, 13 Drawing Sheets

(56) References Cited

U.S. PATENT DOCUMENTS

| | | |
|---|---|---|
| 10,125,905 B2 | 11/2018 | Stahn |
| 10,479,339 B2 | 11/2019 | Callahan et al. |
| 10,895,336 B2 | 1/2021 | Koyuncu et al. |
| 2002/0182356 A1* | 12/2002 | Guippe |
| 2005/0087984 A1* | 4/2005 | Weick ................ F16L 19/0286 |
| 2011/0204623 A1 | 8/2011 | Weick et al. |
| 2018/0313477 A1 | 11/2018 | Emmerhoff |
| 2020/0271251 A1 | 8/2020 | Gunji et al. |
| 2021/0048125 A1* | 2/2021 | Liao ..................... F16L 13/141 |
| 2021/0301959 A1 | 9/2021 | Stavros |
| 2022/0381379 A1* | 12/2022 | Seino ................ F16L 19/0286 |

\* cited by examiner

FEMALE ISO FLARE UNION WITH INTEGRATED MATING BRAKE ISO F FLARE PORT

CROSS REFERENCE TO RELATED APPLICATIONS

The present application claims the priority of U.S. Ser. No. 63/321,144 filed Mar. 18, 2022.

FIELD OF THE INVENTION

The present invention relates generally to a flared tube end joint fittings incorporated into fluid to fluid line connection systems. More specifically, the present invention discloses a female ISO flare union with integrated mating brake ISO F flare port for providing a secure and leak free connection between first and second fluid carrying tubes inserted into opposite open ends of the female union. Also disclosed is a process for forming a fluid tight union between first and second fluid carrying tubes.

BACKGROUND OF THE INVENTION

The prior art is documented with examples of flared and other end connections for establishing a reliable seal between opposing tube end forms. A first example of this is taught by the flare fitting assembly of Schroeder U.S. Pat. No. 6,729,659 which teaches a first coupling member and a second coupling member adapted to be cooperatively coupled together. The first coupling member has a first through bore with one end adapted to accept and retain a first tube. The second coupling member has a second through bore adapted to be disposed upon a second tube with an outwardly flared end. An arcuately shaped seating surface is disposed within the first through bore of the first coupling member. A conically flared seating surface is disposed within the second through bore of the second coupling member adapted to engage an outer surface of the flared end of the second tube such that a line seal is formed between the inner surface of the flared end of the second tube and the arcuate surface when the first and second coupling members are cooperatively coupled.

A further example of a related tube connection is depicted in U.S. Pat. No. 5,346,262, to Liebig, which is provided for thin-walled, small caliber metal tubes particularly for brake, fuel and hydraulic lines on motor vehicles and for use in refrigeration equipment, with at least one of the metal tubes being provided with a flange on the end to be connected and the metal tubes being encompassed by a sleeve in each case, one of which is deformable so as to form a fixed connection between the sleeves, the deformable sleeve being constructed as an outer sleeve which encircles the other sleeve constructed as an inner sleeve in the assembled condition at least over a portion of its length. The inner sleeve is provided with a circular thicker portion at the end nearest the flange so that a part of the outer sleeve is deformable behind this thicker portion.

U.S. Pat. No. 10,895,336 to Koyuncu et al., teaches a tube connecting device for tubes having a flared end defining a conical front surface and a rear surface. A threaded sleeve has a through opening for receiving the tube. A connector having a conical seating surface for receiving the front surface of the flared end and a threaded portion is meshable with the threaded sleeve. A ring is arranged between the rear surface of the flared end and the threaded sleeve when the threaded sleeve is screwed.

Stavros US 2021/0301959 teaches a fluid connector assembly having a connector body with a female end portion and a male end portion. The female end portion includes an internal bore extending through the female end portion from an annular opening to an inner seat. The inner seat defining a concave frustoconical surface. The male end portion includes an internal bore axially aligned with the female bore extending from an opening at a head end of the male end portion to a second opening at the female end portion inner seat.

The head end includes an abutting face disposed around the first opening. The connector body is arranged to accept an elongated tube having a concave flared end extending through the male bore from the first opening with the flared end resting on the inner seat. The connector body is further adapted to receive an elongated tube having a spherical/convex flared end through the female bore and the male bore with the spherical/convex flared end extending outward from the first opening at the head end with the spherical/convex flare resting on the abutting face.

A further example from the prior art is shown in CN 208793842 for a hard tube structure including a braking hard tube, hard tube bolt and hard tube nut. The hard tube bolt is connected with the hard tube nut thread, with both ends equipped with flaring about the braking hard tube.

SUMMARY OF THE INVENTION

The present invention discloses a female ISO (International Organization for Standardization) flare union with integrated mating brake ISO F flare port for providing a secure and leak free connection between first and second fluid carrying tubes inserted into the female union forming part of a brake line union or similar fluid transfer system. A female body has a first open end and a second open and interiorly threaded end. A flared mating port is inserted into the body through the first end. A first outwardly annularly flared inserting end form of the first tube inserts into the first end in contact with a first end face of the mating port.

A press operation forms an inward flare to the first open end of the female body to capture the mating port and the first tube end form. A second outwardly annularly flared inserting end form of the second tube inserts through the second open end and into contact with a second end face of the mounting port. A mating flare nut coaxially surrounds the second fluid carrying tube and exhibits a plurality of exterior threads at a forward end which threadably inter-engage with the interior threads of the female body, with tightening causing a forward end abutment of the mating flare nut to actuate against an inside ledge of the second outwardly annularly flared inserting end form of the second tubing section.

Other features include a machined annular stop configured within an inner diameter of the female body against which is contacted the flared mating port. The first and second end faces of the flared mating port each further include an inwardly dovetailed profile against which are seated said annularly flared end forms of each of the first and second tubes.

A corresponding process for forming a fluid tight union between first and second fluid carrying tubes is also disclosed and includes the steps of constructing a female body having a first open end and a second open and interiorly threaded end, inserting a flared mating port into the body through the first end, inserting a first outwardly annularly flared inserting end form of the first tube into the first end in contact with a first end face of the mating port and press forming an inward flare to the first open end to capture the mating port and the first tube end form.

Other steps include inserting a second outwardly annularly flared inserting end form of the second tube inserting through the second open end and into contact with a second end face of the mating port. Additional steps further include advancing a mating flare nut coaxially surrounding the second fluid carrying tube and exhibiting a plurality of exterior threads at a forward end in order to threadably inter-engage with the interior threads of the female body, and causing a forward end abutment of the mating flare nut to actuate against an inside ledge of the second outwardly annularly flared inserting end form of the second tubing section.

A further embodiment for establishing a fluid-tight union for such as forward and rear interconnecting brake lines is also disclosed and includes a female body having a first open end and a second reduced diameter open end, a plurality of interior threads extending from the first open end to an interior shoulder communicating with the second reduced diameter open end. The rear fluid carrying line further has a first expanded end profile such that, upon the female body being slid along the rear fluid carrying tube, the interior shoulder abuts against the first expanded end profile with the rear line extending from the second open end.

The forward fluid carrying line exhibits a second expanded end profile which, upon inserting through the first open end, mates against the first expanded end profile. A flare nut coaxially surrounds the forward fluid carrying line and has an integral extending body exhibiting exterior annular threads which inter-engage with the interior threads of the female body. A narrowed forward end abutment portion of the flare nut further has an end profile dimensioned to contact an opposing surface of the second end profile, with tightening of the flare nut in a direction towards the first open end causing the second end profile to actuate against the first end profile in order to fluidly seal the forward and rearward fluid carrying lines within the female body.

The first expanded end profile can further include a female flared end form, with the second expanded end profile a male flared end form. A press crimping operation utilizes a die for inwardly deforming a reduced diameter portion of the female body against the rear fluid carrying tube. At least the rear fluid carrying tube includes a polyamide coating to shelter the tube during the crimping to prevent damage.

Additional features include the female receiving end form exhibiting a rear angled profile varying to between one hundred and twenty to one hundred and thirty eight degrees relative to a centerline axis extending through the rear fluid carrying line. As is also shown, the female union body can also exhibit a hexagonal exterior shape.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
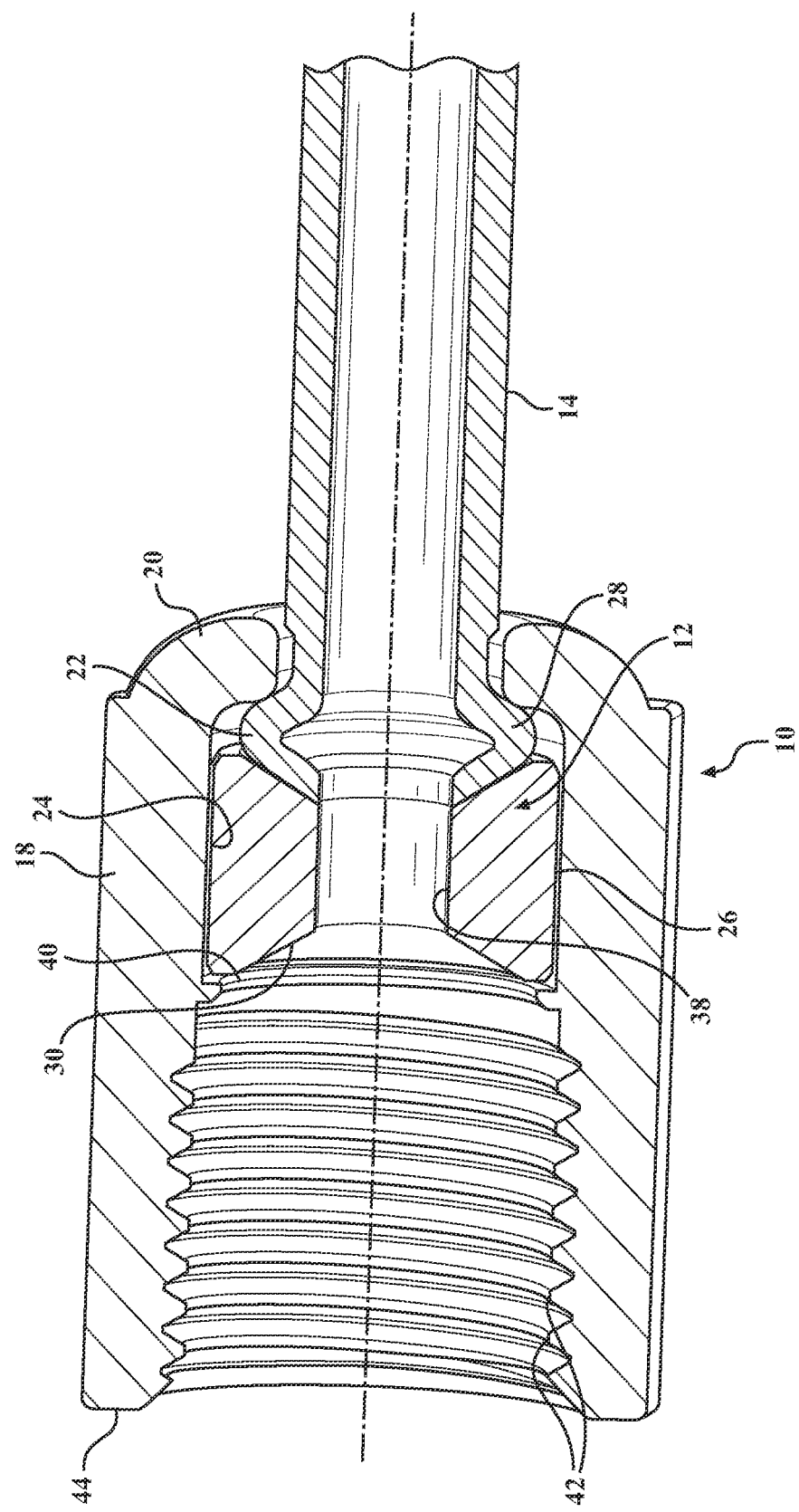
FIG. 1 is a length cutaway perspective of a female threaded union with inwardly press/clinch formed flare and within which is installed an ISO flare mating port, a male tubing with end form engaged within the female union and against the flared mounting port.

With reference to the attached illustrations, the present invention discloses a female ISO flare union, generally at 10 in FIG. 1, with integrated mating brake ISO F flared mating port 12 for providing a secure and leak free connection between first 14 and second 16 (see FIG. 7) fluid carrying tubes inserted into the female union. As further shown in the length cutaway perspective of FIG. 1, the female threaded union includes a generally nut shaped body 18 (if viewed in perspective) having a press or clinch formed first end flare 20 (see also pre-formed configuration in FIGS. 2-5A prior to clinch/press forming of the end flare into the female nut body 18). The end flare 20 is formed following pre-installation of the ISO flare mating port 12 and against which is contacted an outwardly annularly flared inserting end form 22 of the first male tubing 14, and which is engaged within the female union 10 and against the flared mating port 12.

Referencing again FIG. 1, the female union body 18 defines a smooth inner diameter 24 into which the ISO flared mating port 12 is installed from a first inserting direction. The mating port 12 exhibits a smooth, typically annular outer surface 26 (see FIG. 2) which is closely dimensioned to seat inside the smooth inner diameter 24 of the female union 10 in close adhering contact.

The mating port 12 further includes inwardly flared or dovetailed faces 28 and 30 (see FIG. 2) against which are seated the annularly flared end forms of each of the first male tubing 14 (previously identified at 22) and an opposing and similarly flared end (at 32 in FIG. 7) associated with the second 16 male tubing. In this fashion, a continuous fluid flow passageway is established between inner diameters of each of the tubing sections 14 and 16 (see at 34 and 36 respectively) and inter-abutting ISO flared mating port 12 (see further at inner diameter 38).

Figure 3:
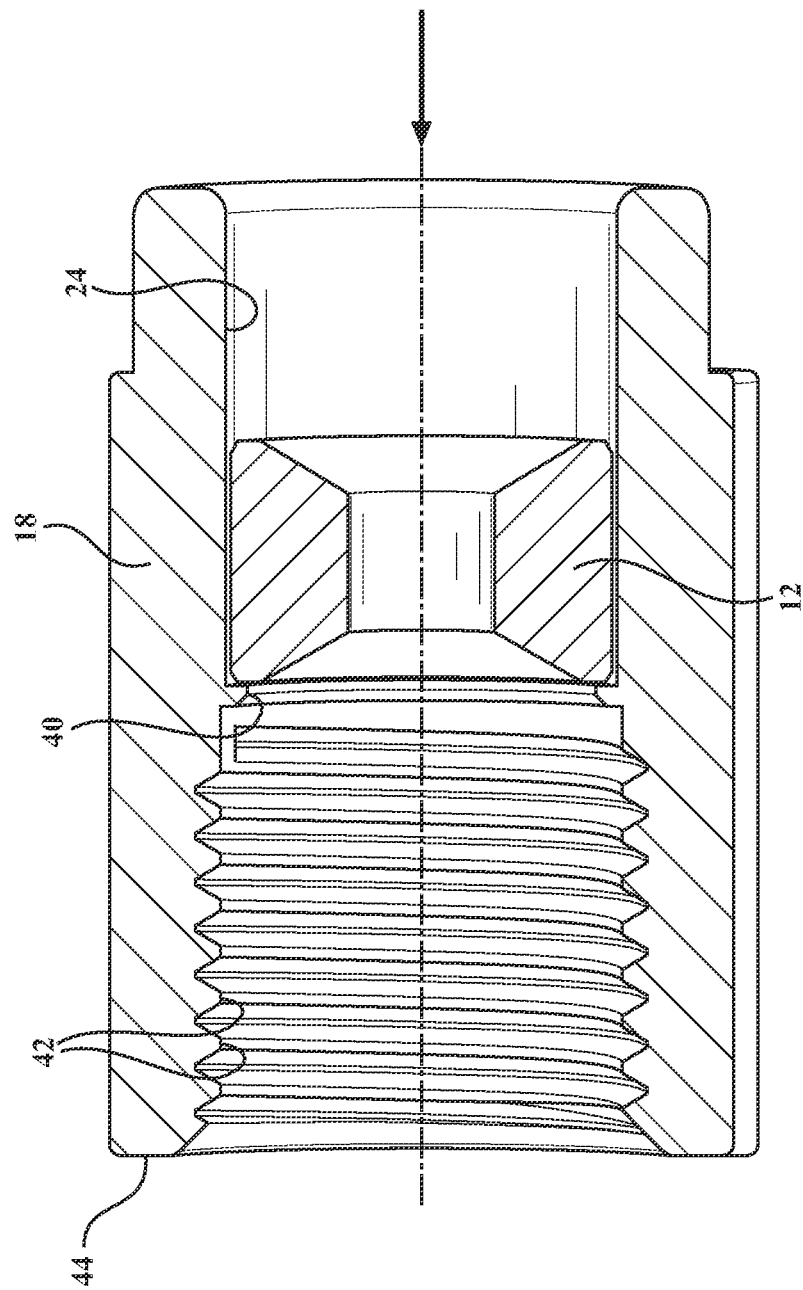
FIG. 3 illustrates an initial operation step outlined in FIG. 2 and by which the ISO flare mating port is inserted into the female nut end until contacting with a machined stop configured within its inner diameter.

The female union body 18 also includes an annular inward protruding end stop 40 which defines a limit to insertion of the ISO flare mating port 12 as depicted in FIG. 3. A plurality of inner threads 42 are configured within the female union body 18 from a second end face 44 opposite that of the first end of the female union defined by the clinch/press formed flare 18.

Figure 7:
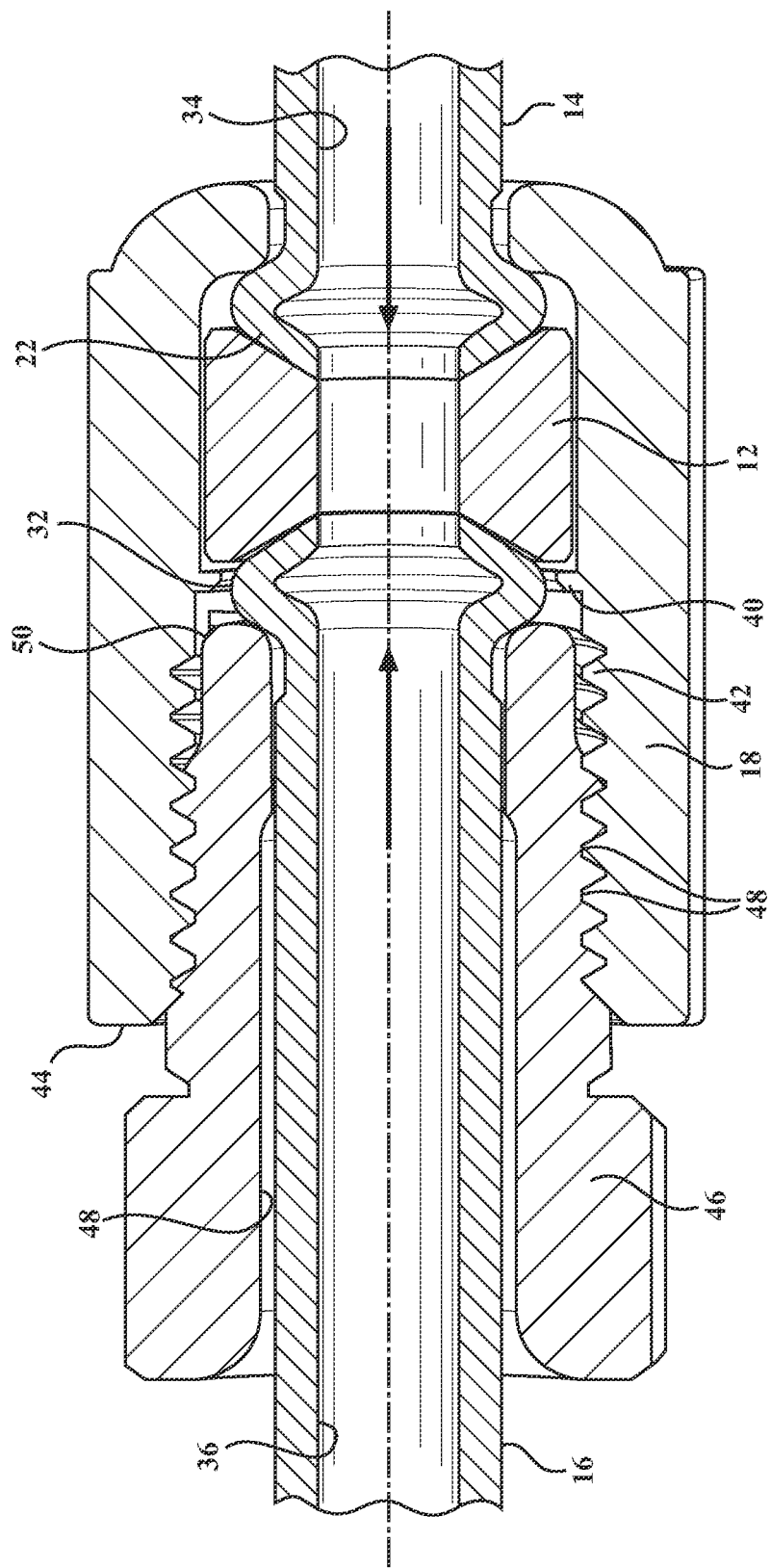
FIG. 7 is a further succeeding view to FIG. 6 and depicting a second tube with flared end inserted within the female nut from an opposite direction into contact with an opposite end face of the ISO flare mating port and which, following a torque operation by which the interior threads of the female nut inter-engages with opposing mating exterior threads of a male mating flare nut coaxially surrounding the second tube and installed behind the second tube end flared end form within a second end of the female nut, resulting in the female union nut being trapped onto the second tube and the mating ISO flare union trapped inside, and with a clockwise torqueing/rotational tightening of the male nut into the female union, results in both ISO flares sealing into the ISO port.

As shown in FIG. 7, a mating flare nut 46 having an inner diameter 48 is coaxially pre-installed over the second male tubing section 16. The flare nut 46 further exhibits a plurality of exterior threads 48 at a forward end which threadably inter-engage with the interior threads 42 of the female union body 18, with completed tightening causing a forward end abutment 50 of the mating flare nut 46 which actuates against an inside ledge of the flared end 32 of the second tubing section 16.

Figure 2:
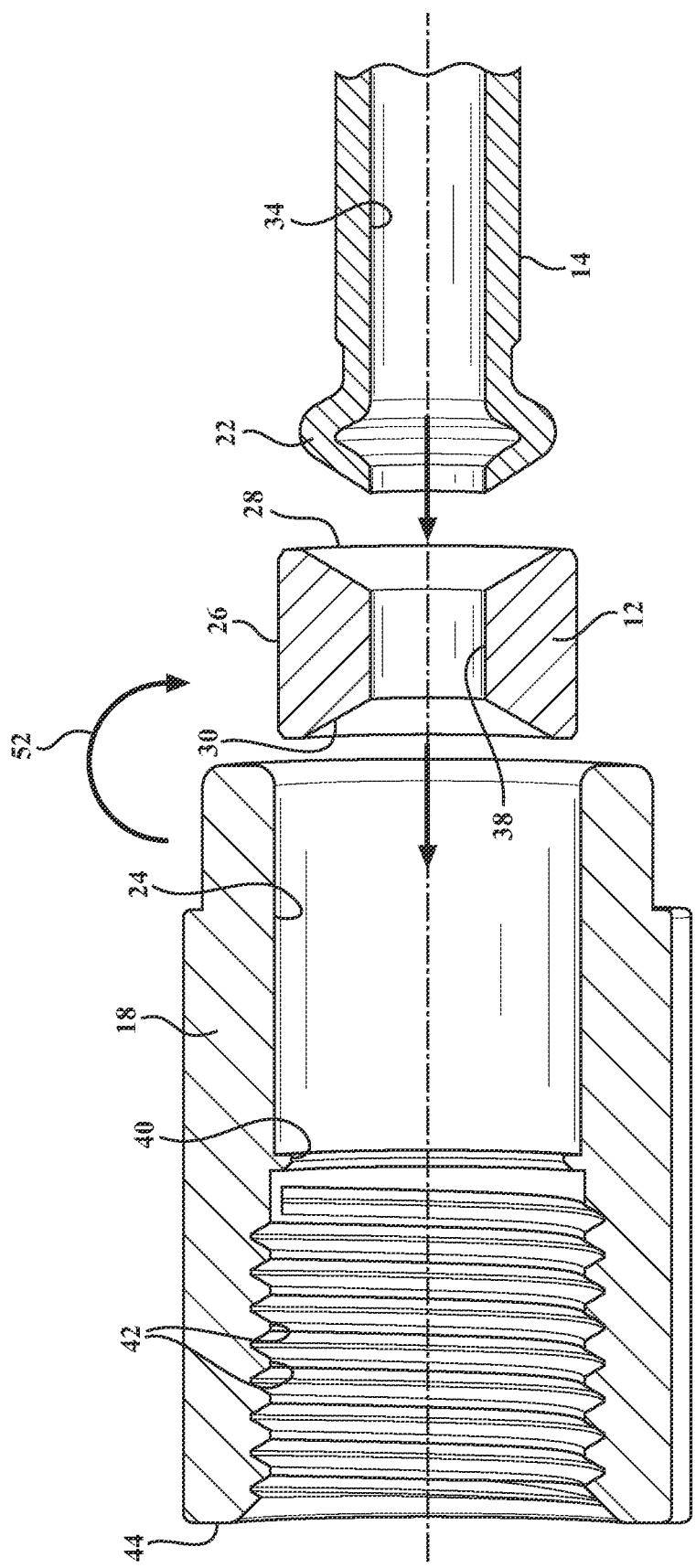
FIG. 2 is an illustration of a protocol for forming the tube end fitting and which includes installing the ISO flare mating port and ISO flare within the female union, following which a press forms an inward annular end flare on the female end in order to secure the male tubing and ISO flare mounting port.

FIG. 2 presents an illustration of a protocol for forming the tube end fitting and which includes installing the ISO flared mating port 12 and ISO flare 22 of the tubing section 14 within the female union 18. Following this, a press or like clinching operation (see as represented at 52 in each of FIGS. 2 and 5B) forms the inward annular end flare 20 on the female end in order to secure in a sealed arrangement the pre-inserted first male tubing 14 with iso flare 22 and ISO flared mating port 12.

Figure 4:
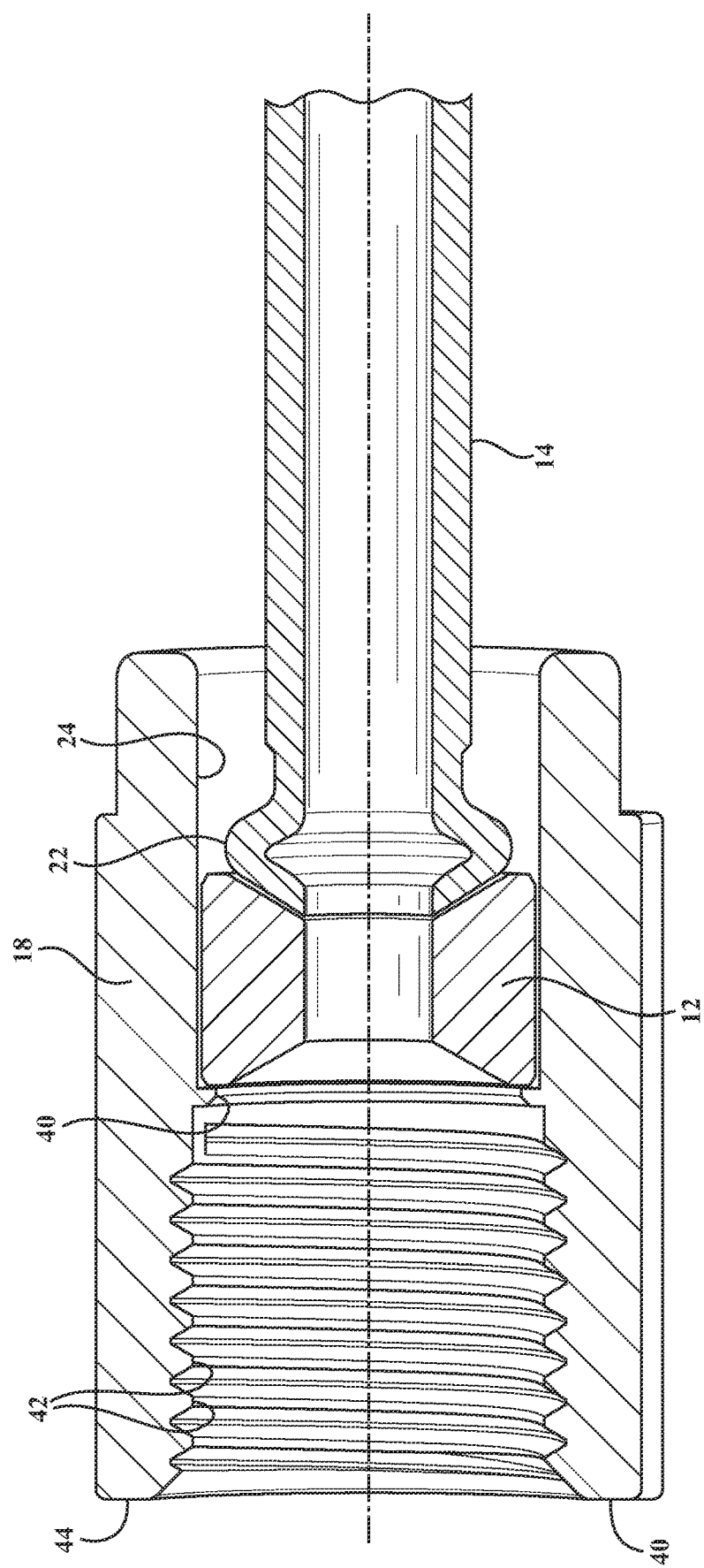
FIG. 4 is illustrates a succeeding operation step to FIG. 3 in which the ISO flare end of the male tube end form is inserted within the female nut end up to contact with the previously installed mating port, such in preparation to clinch or trap the components together in a press operation.

Proceeding to FIG. 3, illustrated is an initial operation step outlined in FIG. 2 and by which the ISO flare mating port 12 is inserted into the female nut end until contacting with a machined stop configured within its inner diameter (see again abutment at 40). FIG. 4 is illustrates a succeeding operation step to FIG. 3 in which the ISO flare end 22 of the male tube 14 form is inserted within the female nut end 18 up to contact with the previously installed mating port 12, such in preparation to clinch or trap the components together during the suitable clinching or press operation.

Figure 5A:
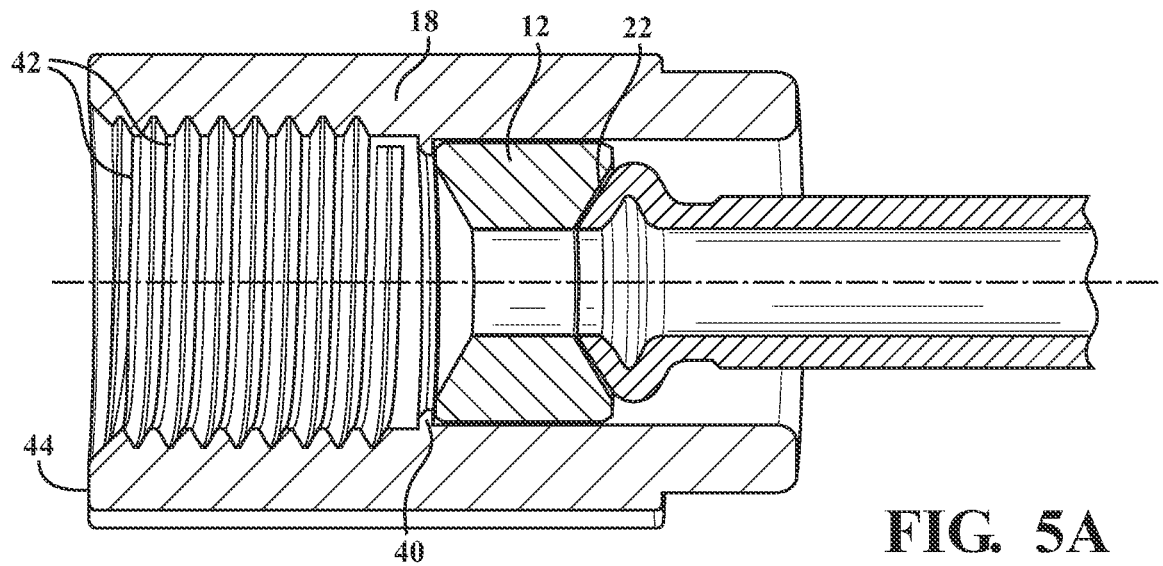
FIGS. 5A-5C illustrate the steps included with the press clinch operation and which include each of an initial installation view in length cutaway (FIG. 5A) which repeats that shown in FIG. 4, an intermediate clinch/press operation (FIG. 5B) in which the inward annular flare is configured into the female end form and a post press illustration (FIG. 5C) corresponding to FIG. 1 and illustrating the completed flared end resulting from the press/clinch operation.
Figure 5B:
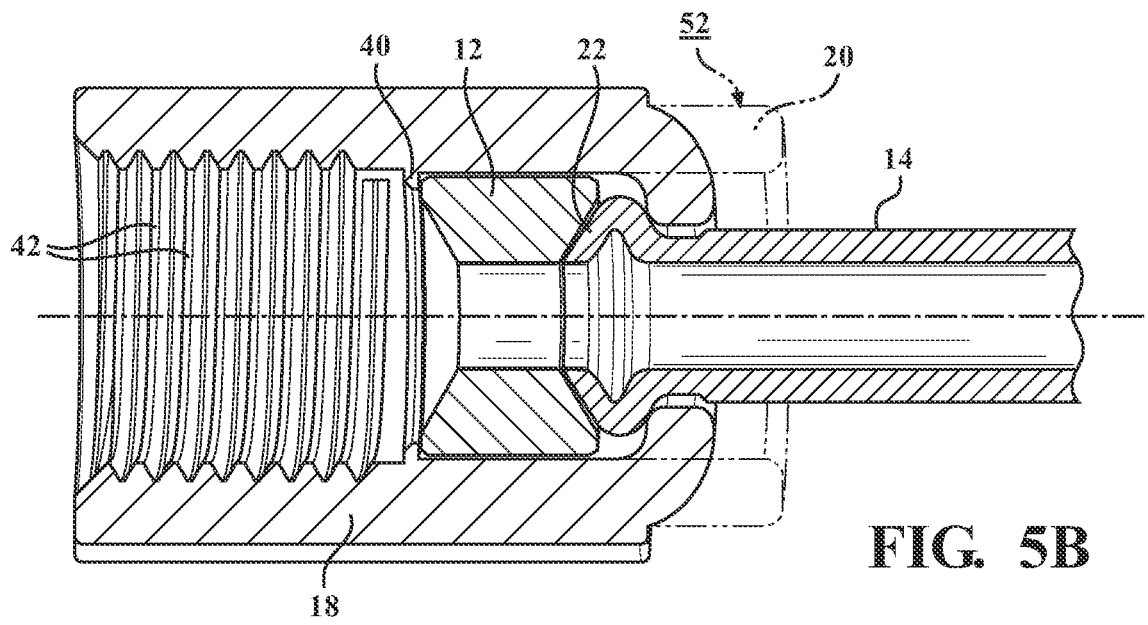
Figure 5C:
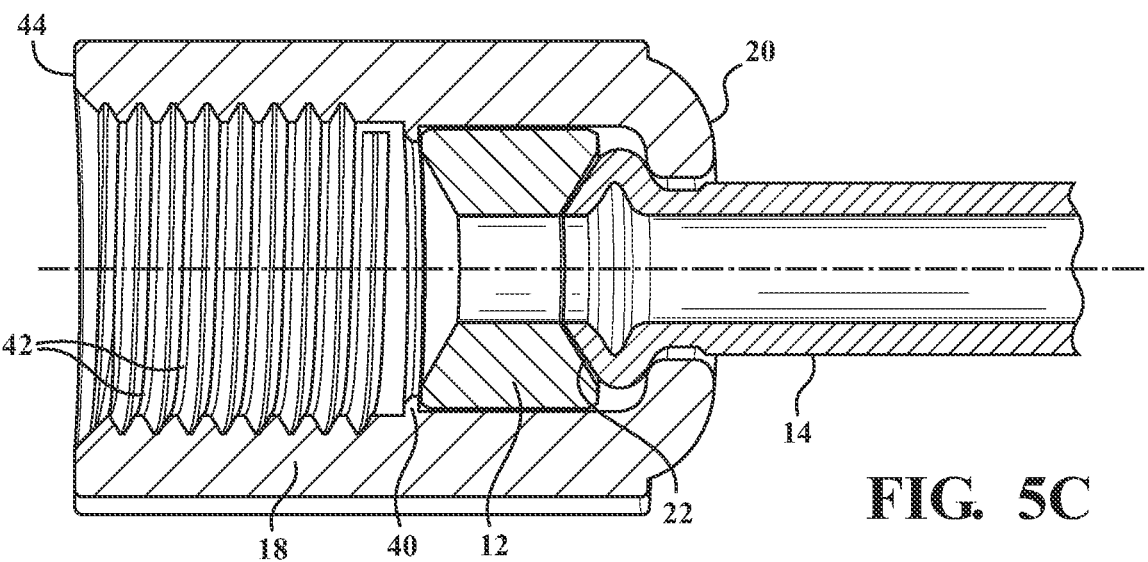

FIGS. 5A-5C illustrate the steps included with the press clinch operation and which include each of an initial installation view in length cutaway (FIG. 5A) which repeats that shown in FIG. 4, the intermediate clinch/press operation (again depicted at 52 in FIG. 5B) in which the inward annular flare 20 is configured into the female end form and, lastly, with a post press illustration (FIG. 5C) corresponding to FIG. 1 and illustrating the completed flared end 20 resulting from the press/clinch operation, and by which the flared mating port 12 is secured inside the female union with the first tube 14 and flared ISO end profile 22.

Figure 6:
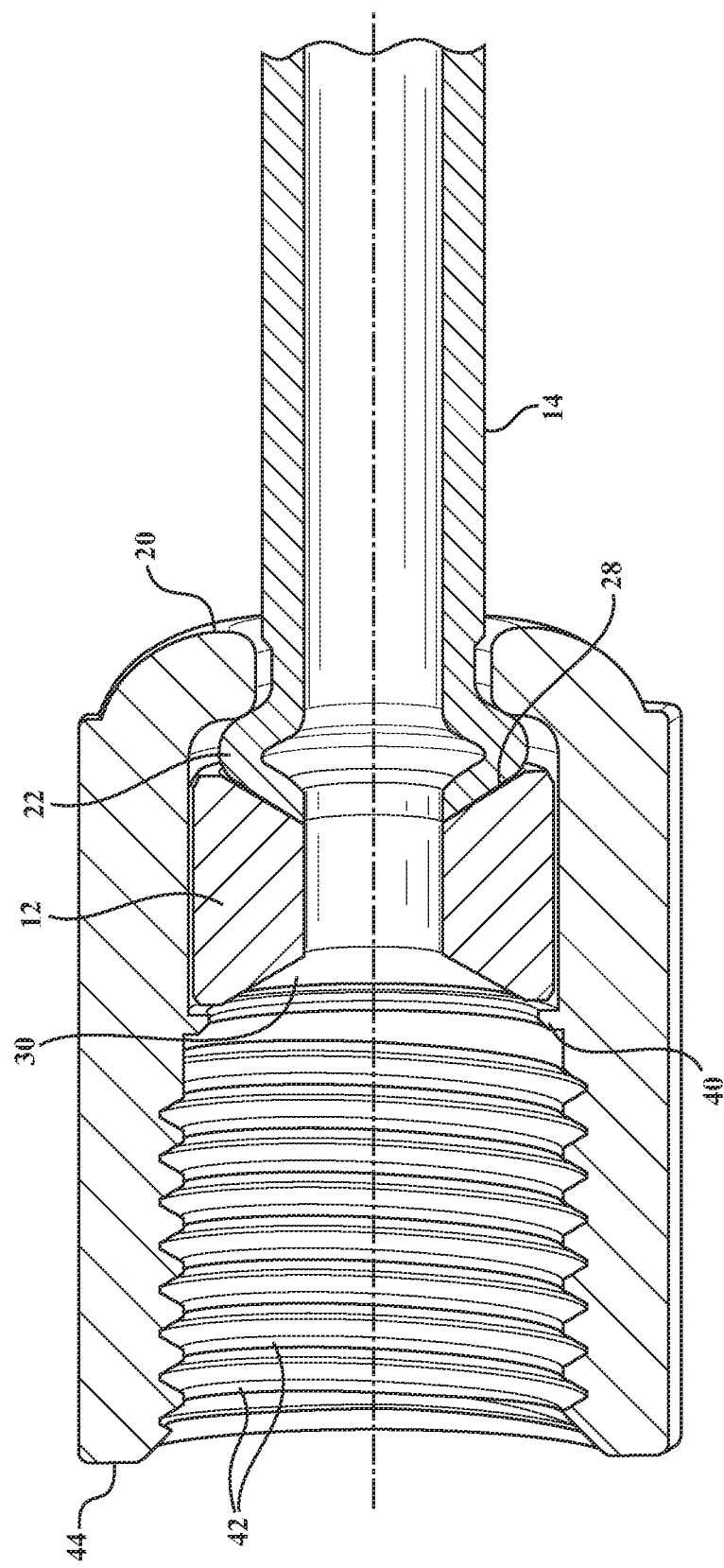
FIG. 6 substantially re-presents the illustration of FIG. 5C prior to a torqueing operation being formed on the mating flare and nut.

FIG. 6 substantially re-presents the illustration of FIG. 5C, and prior to a torqueing operation being formed on the mating flared port 12 and female nut body 18. This is depicted with further reference to FIG. 7, which is a further succeeding view to FIG. 6, and in which the second tube 16 with flared end 32 is inserted within the flared mating 12 from an opposite direction (through second open end face 44 defining the interior threads 42) and into contact with the opposite end face 30 of the ISO flare mating port 12.

At this point, and as previously described, the exteriorly coaxially supported mating flare nut 46 is forwardly displaced along the second tube 16 until its exterior threads 48 rotatably inter-engage with the interior threads 42 configured within the female union nut body 18. The mating male flare nut 46 is turned clockwise in order to be torqued into the female nut 18, resulting in the female union nut being trapped onto the second tube 16 and the mating ISO flared port 12 being trapped inside, thereby resulting in both opposing arrayed tubes 14/16 sealing onto the ISO flared mating port 12 via the compressing of the corresponding tube flared ends at 22 and 32.

Figure 8:
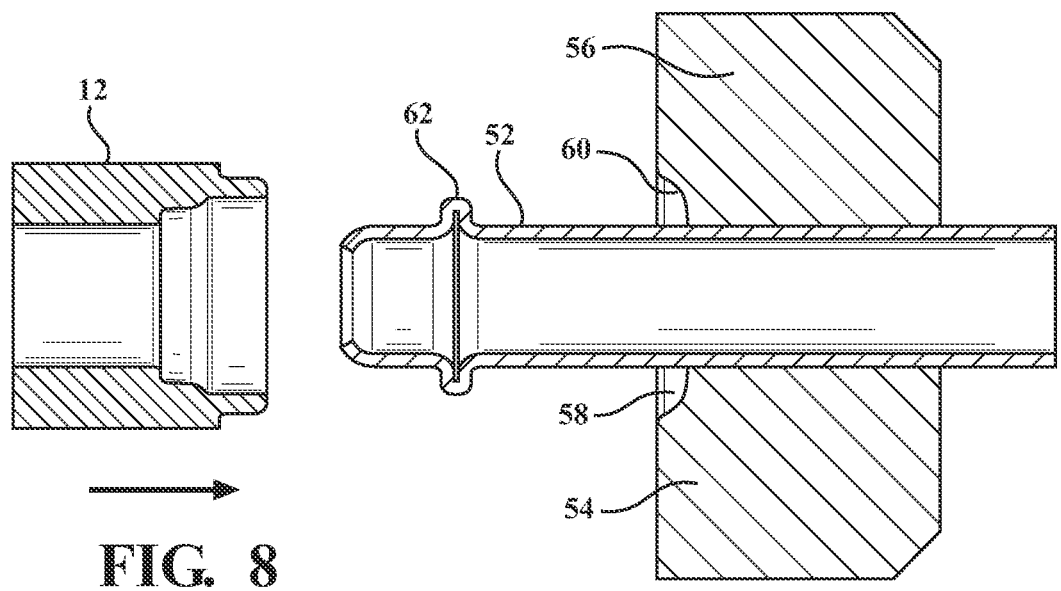
FIGS. 8-10 present a series of line are views corresponding to the press/clinch forming operation for forming the flared end to the female nut following pre-insertion of the ISO flare mating port and first male tube end form.
Figure 9:
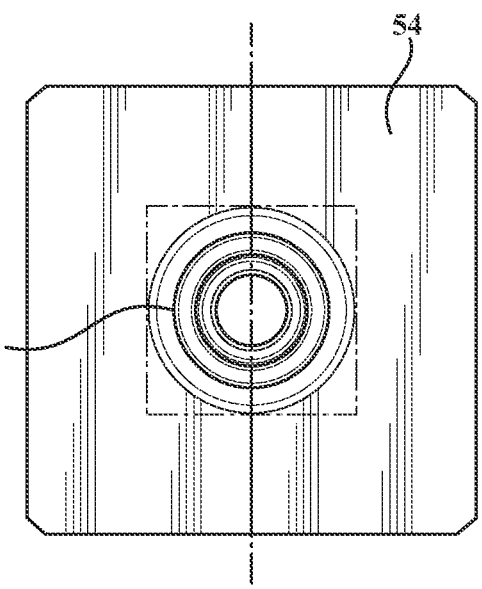
Figure 10:
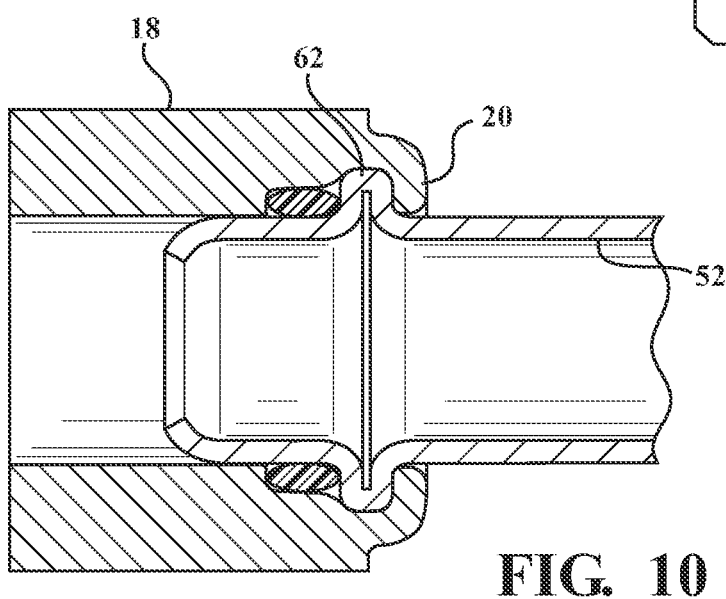

Finally, FIGS. 8-10 present a series of line are views corresponding to a related press/clinch forming operation, such as is known in the existing art, for forming the flared end to the female nut 12, this again following pre-insertion of the ISO flared mating port 12 and first male tube end form 22 (not shown).

FIG. 8 again depicts a variant of the clinch/press configuration 52 and which, in combination with a pair of end-form press locking jaws 54/56 securing such as the press, compresses the same against the female nut body 18 so that the flared end form is created, such occurring via profile recesses 58/60 which are machined into the locking jaws 54/56 and into which the material from the annular end face of the female union is contacted and in such a fashion that the material is forced to fold about a back end of a patterned annulus 62 defined in the press configuration 52.

FIG. 9 presents a rotated end view of a selected locking jaw 54 and either of the first or second tubes 14/16. Finally, FIG. 10 further depicts the completed operation by which the flared end profile is formed.

It is further understood that the press/clinching operation depicted and described herein can be adapted for use with the ISO flare union of FIGS. 1-7 or any suitable alternative assembly and process envisioned. The female union body 18, ISO flared mating port 12, first and second male tubing 14/16 and mating flare nut 46 can all be constructed of a suitable grade steel or other non-corrosive metal. Without limitation, it is also envisioned that the components of the present invention can be constructed of other non-metallic materials including aluminum, and further not limited to durable and rigid polymers and like composites.

Also disclosed is a process for forming a fluid tight union between first and second fluid carrying tubes, including the steps of constructing a female body having a first open end and a second open and interiorly threaded end, inserting a flared mating port into said body through said first end and inserting a first outwardly annularly flared inserting end form of the first tube into the first end in contact with a first end face of the mating port. Additional steps include press forming an inward flare to the first open end to capture the mating port and the first tube end form and inserting a second outwardly annularly flared inserting end form of the second tube inserting through the second open end and into contact with a second end face of the mating port.

Other steps include advancing a mating flare nut coaxially surrounding the second fluid carrying tube and exhibiting a plurality of exterior threads at a forward end in order to threadably inter-engage with the interior threads of the female body, causing a forward end abutment of the mating flare nut to actuate against an inside ledge of the second outwardly annularly flared inserting end form of the second tubing section.

Figure 11:
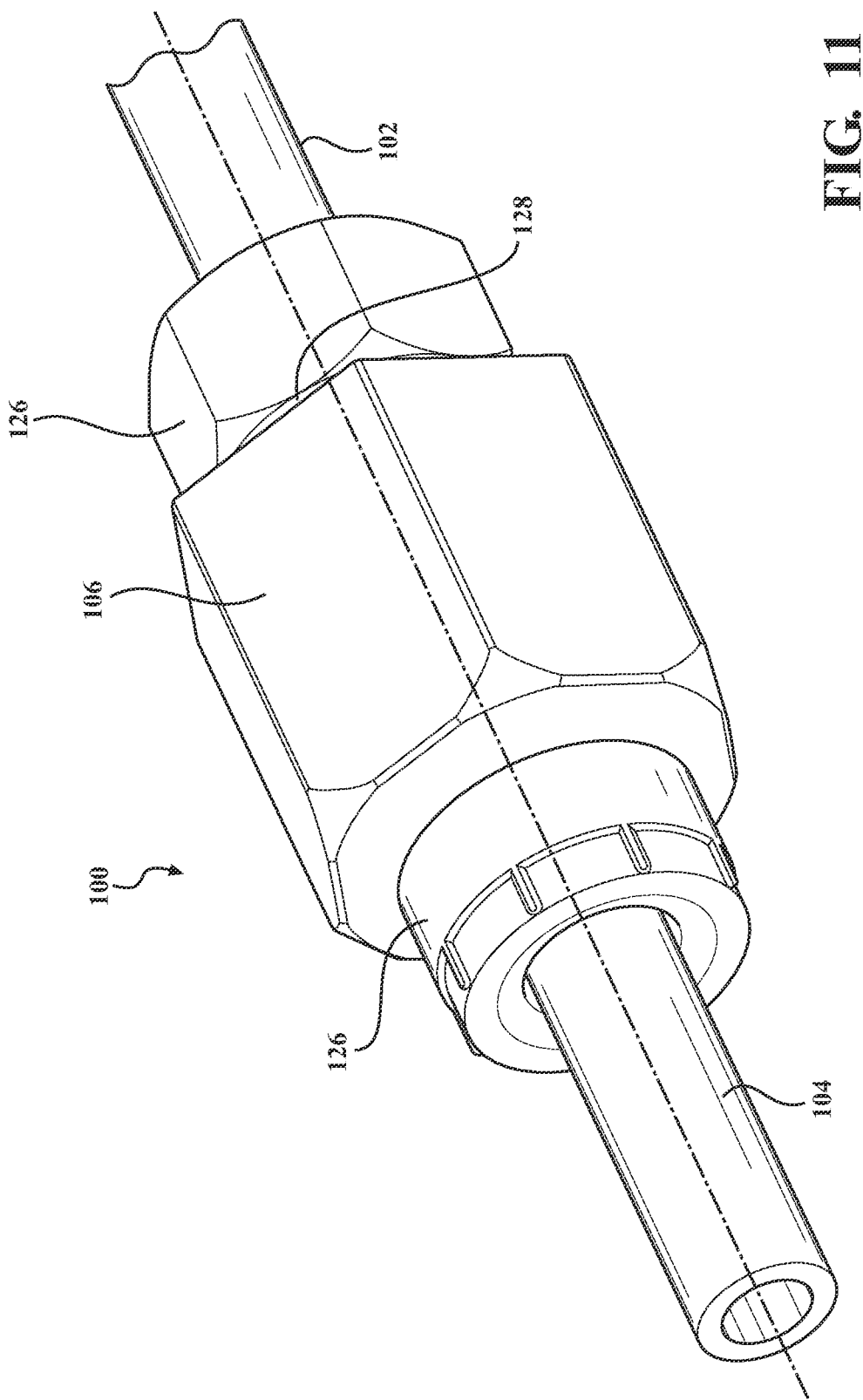
FIG. 11 depicts a perspective view of a brake union according to a further embodiment which is crimped to a rear brake line in order to prevent the union from sliding away from a mating joint during assembly.

With reference to FIG. 11, depicted is a perspective view as generally shown at 100 of a brake union according to a further embodiment. A forward located brake line 102 is provided, such as extending from an ABS control unit (not shown). A rear located brake line 104 extends from a female union body (referenced by a lengthened hex nut shaped component 106) to a rear wheel of the vehicle (not shown). Without limitation, the brake lines shown can be substituted by any fluid carrying tube associated with any related application contemplated by the present invention.

Figure 12:
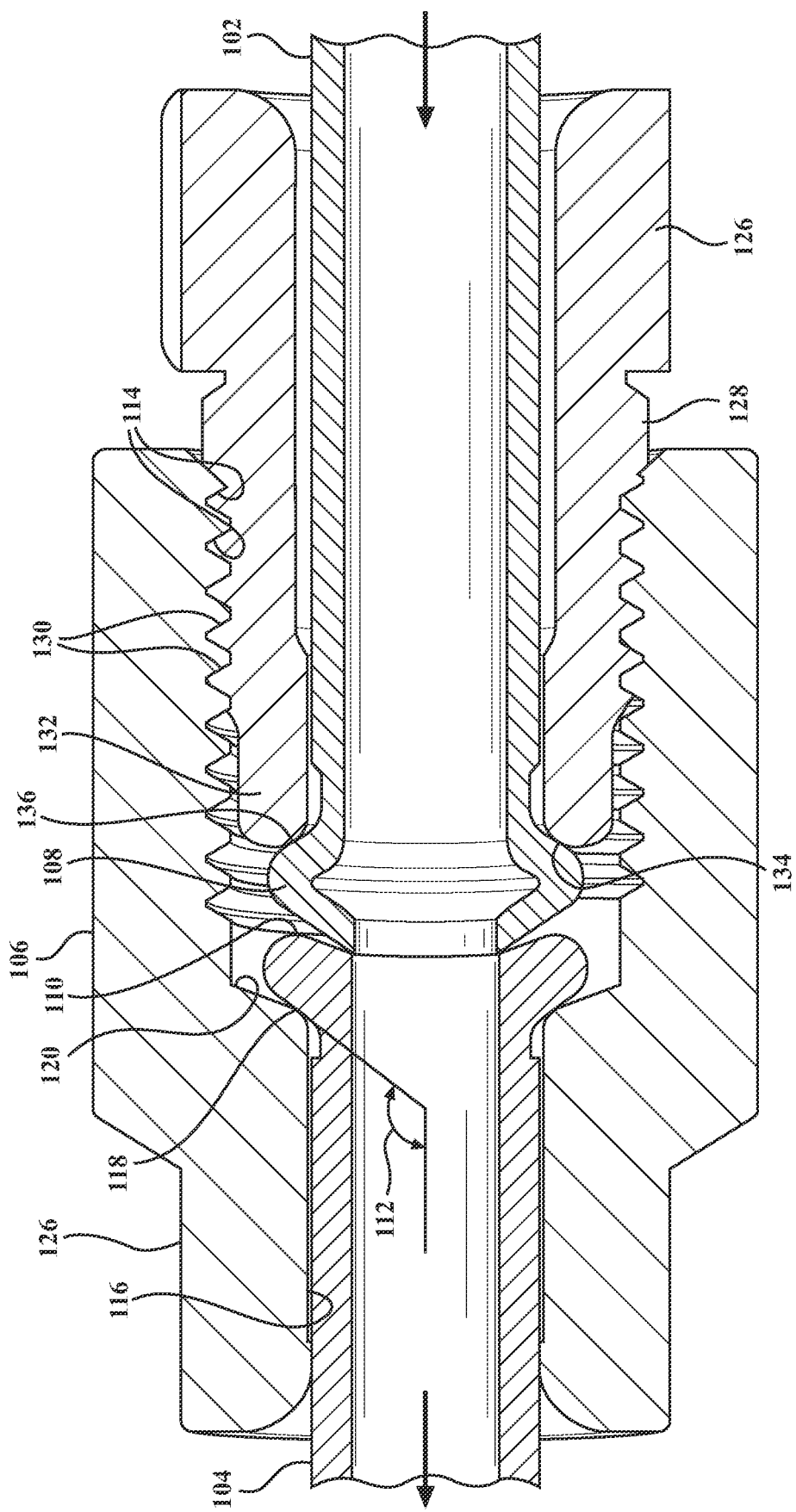
FIG. 12 presents a length cutaway perspective of the female threaded union shown in FIG. 11 for connecting a rear wheel extending brake line with a further brake line extending from a front vehicle system including an ABS control unit, this allowing for vehicle sub-assembly manufacturing to be completed without the necessity of using longer and easily bent or kinked small diameter tubes.

As shown in the length cutaway view of FIG. 12 the forward brake line 102 exhibits an outwardly annularly expanded profile, without limitation shown as an ISO inserting male end form 108 which, upon completed installation opposes and seats against a corresponding expanded profile in the form of a female end form 110 configured in the rear brake line 104. Without limitation, the male 108 and female 110 end forms can be reversed from that shown in a reconfiguration of the forward 102 and rear 104 brake lines.

Figure 13:
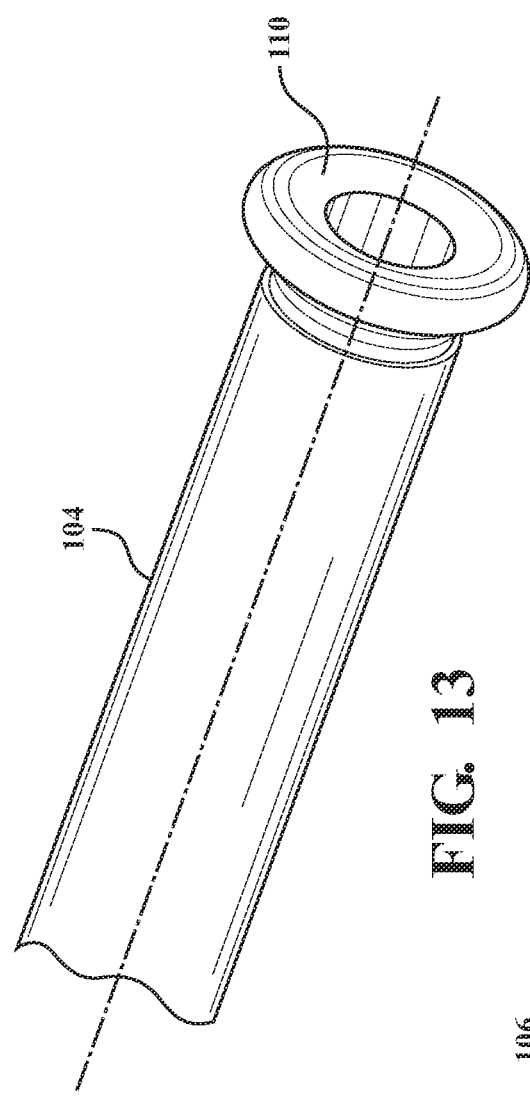
FIG. 13 presents a perspective view of female receiving flare configured into the rear brake line which is cold-formed to a specified degree depending upon OEM specifications.

The rear brake line 104 is shown in perspective in FIG. 13 and better depicts the female receiving end form 110. Without limitation, the end form 110 can be cold formed so that its rear angled profile (at 118 in FIGS. 12 and 15) exhibits a specified flare, see as designated at 112 in FIG. 12, and which can without limitation vary to between one hundred and twenty to one hundred and thirty eight degrees relative to a centerline axis extending through the rear line 104, depending upon OEM specifications.

Figure 14:
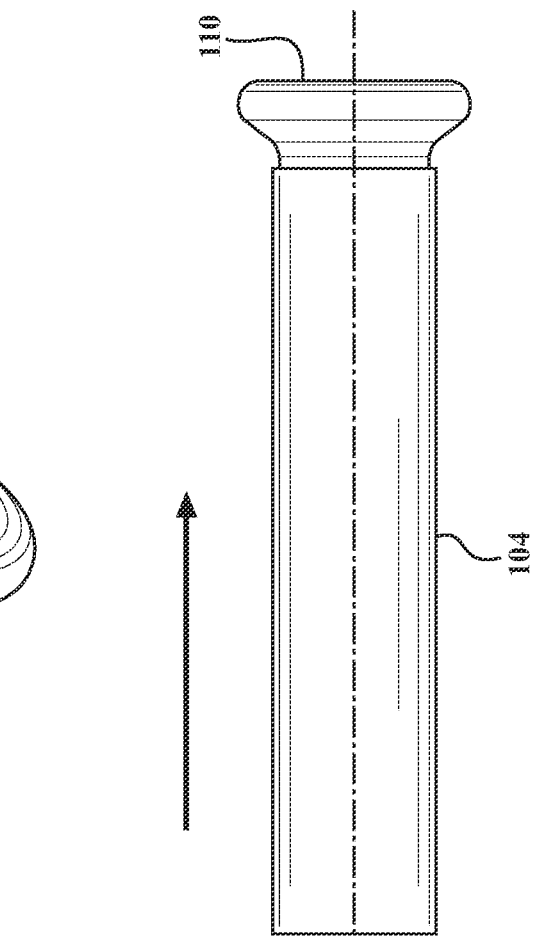
FIG. 14 is an assembly plan view depicting the female union being slid up the back of the formed sealing port on the brake tube.
Figure 14:
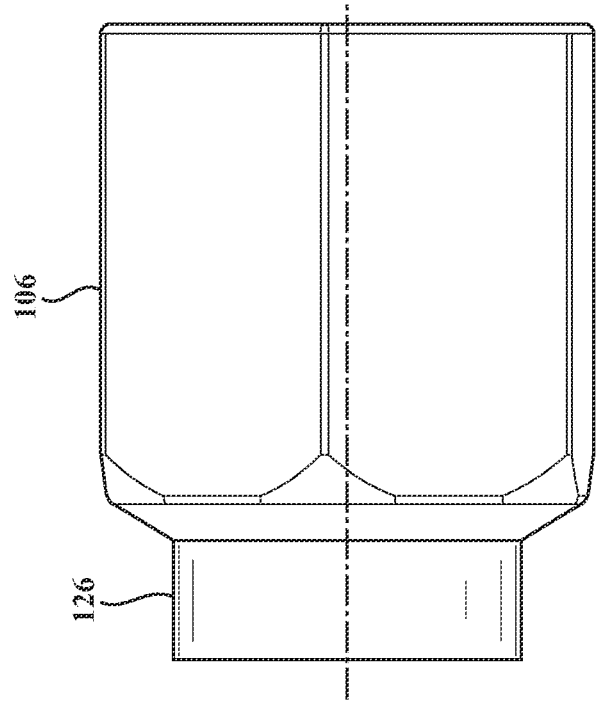

The female body 106 as shown in FIG. 12 depicts interior threads 114 communicating with a forward open end of the union body 106, along with a reduced diameter and smooth interior 116 communicating with a rearward open end 116. In a first installation step, and as shown in the assembly plan view of FIG. 14, the female union 106 is slid (see arrow 117) up the back of the formed sealing port on the brake line 104, such that the exterior tubular diameter of the line 104 is closely dimensioned to the reduced smooth inner diameter open end 116 of the female union (see FIG. 15).

Figure 15:
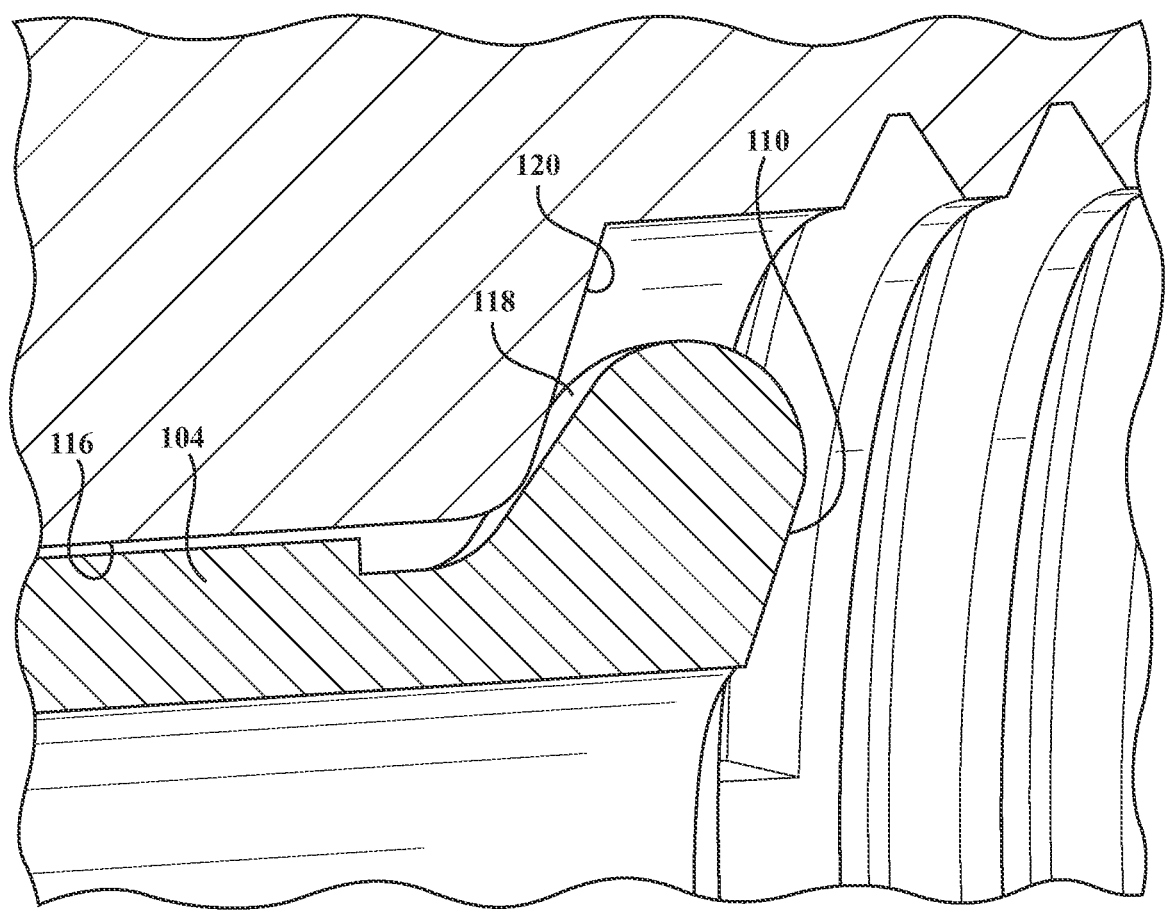
FIG. 15 is an expanded partial view taken from FIG. 12 and depicting the female flare end of the rear brake line seating against an interior shoulder of the union.
Figure 16:
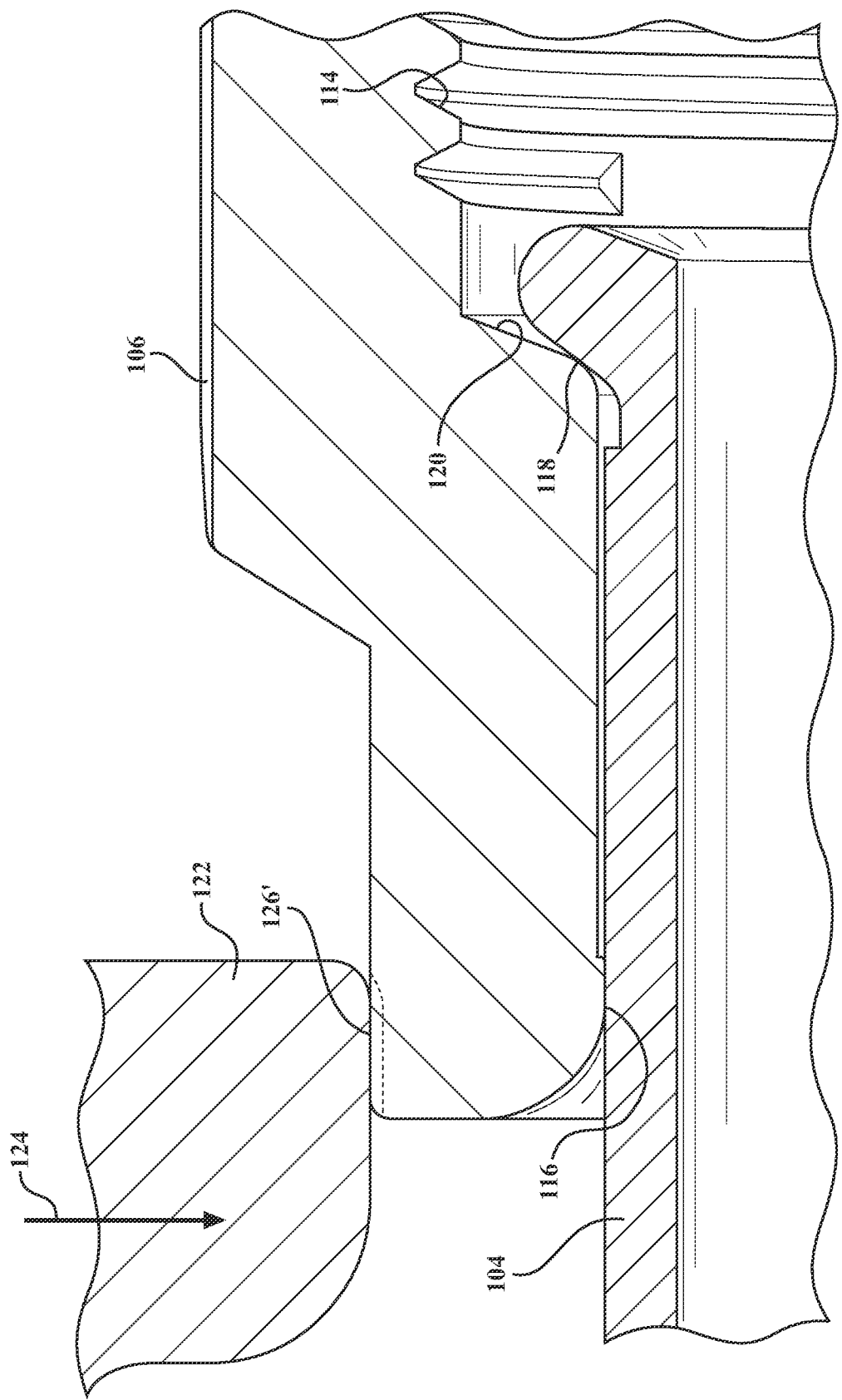
FIG. 16 is an illustration of a press crimping operation utilizing a die for locking the rear brake line to the female union, the brake tube further including a polyamide or like coating to prevent a sheltering layer to prevent damage during crimping.

As further shown in FIG. 15, which is an expanded partial view taken from FIG. 12, depicted is the female flare end of the rear brake line 104, including the rear contoured surface 118 seating against an interior opposing contoured shoulder 120 of the union once it is fully slid forwardly over the rear line 104. At this point, FIG. 16 depicts an illustration of a press crimping operation utilizing a die 122 for locking the rear brake line 104 to the female union 106.

A downward pressing force (see at 124) of the die 122 is exerted upon a narrowed diameter end portion of the female union 106, this in order to deform (see further at 126' in FIG. 16) the opposing interior annulus of the end portion and so that its inner reduced diameter 116 is in turn deformed inwardly against the opposing exterior diameter of the rear brake line 104 in order to lock the rear brake line to the female union body 106. Without limitation, the brake tube 104 further can include a polyamide or like coating to shelter the tube during the crimping process to prevent damage.

Referencing again to FIGS. 11-12, a redesigned mating flare nut is shown at 126 (compared to that depicted at 46 in FIG. 7). As best shown in the cutaway view of FIG. 12, the flare nut 126 is depicted in phantom and includes an integral extending body 128 exhibiting exterior annular threads 130 which inter-engage with the interior threads 114 of the female union body 106.

The flare nut also includes a narrowed forward end abutment portion 132 having an arcuate end profile 134 dimensioned to contact an opposing reverse arcuate surface 136 of the ISO male flare 108 (see again FIG. 12). In this fashion, completed tightening of the flare nut in a direction towards the forward open end causes the forward end abutment 132 of the mating flare nut 126 to actuate against the female seating profile of the flare 110 of the rear brake line 104 (previously crimped to the union 106 to prevent sliding of the union from the mating joint during assembly). The crimped union further provides stability and alignment for the front brake line male flares while being torqued to the union.

By the present design, the present invention allows for connecting a rear wheel extending brake line with a further brake line extending from a front vehicle system including an ABS control unit, such permitting vehicle sub-assembly manufacturing to be completed without the necessity of using longer and easily bent or kinked small diameter tubes. As described, the crimped brake union is used to join the rear brakes from each tire up to the front brake control unit to facilitate modular subassembly of the vehicle to be completed without contending with longer smaller diameter tubes with their propensity for being bent.

Other advantages of the present invention include lower torque to seal values as compared to standard unions, as well as less union misalignment opportunities while mating the joints during production. Other improvements include less scrap and rework associated with the OEM assembly facility as well as the ability to remove two fasteners from the vehicle with associated weight savings and a more ergonomic assembly process.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A union assembly for establishing a sealed connection between forward and rear fluid carrying lines, comprising:
   a female body having a first open end and a second reduced diameter open end, a plurality of interior threads extending from said first open end to an interior shoulder communicating with said second reduced diameter open end;
   the rear fluid carrying line having a first expanded end profile such that, upon said female body being slid along the rear fluid carrying line, said interior shoulder abutting against said first expanded end profile with said rear line extending from said second open end;
   the reduced diameter of said female body crimped at said second open end against the rear fluid carrying line;
   the forward fluid carrying line having a second expanded end profile which, upon inserting through said first open end, mating against said first expanded end profile;
   a flare nut coaxially surrounding said forward fluid carrying line and having an integral extending body exhibiting exterior annular threads which inter-engage with said interior threads of said female body, a narrowed forward end abutment portion of said flare nut having an end profile dimensioned to contact an opposing surface of said second end profile, with tightening of said flare nut in a direction towards said first open end causing said second end profile to actuate against said first end profile in order to fluidly seal the forward and rearward fluid carrying lines within said female body.

2. The union assembly of claim 1, said first expanded end profile further comprising a female flared end form and said second expanded end profile a male flared end form.

3. The union assembly of claim 2, further comprising the female flared end form exhibiting a rear angled profile varying to between one hundred and twenty to one hundred and thirty eight degrees relative to a centerline axis extending through the rear fluid carrying line.

4. The union assembly of claim 1, further comprising at least the rear fluid carrying line including a polyamide coating to shelter the rear fluid carrying line during the crimping to prevent damage.

5. The union assembly of claim 1, said female body further comprising a hexagonal exterior shape.

* * * * *